(12) United States Patent
Benton et al.

(10) Patent No.: US 7,567,923 B2
(45) Date of Patent: Jul. 28, 2009

(54) SYSTEM AND METHOD FOR MAPPING INFORMATION COLLECTED IN CONNECTION WITH CREATION OF END-USER ORDERS FOR COMMUNICATIONS SERVICES TO THE CORRESPONDING INTER-PROVIDER ORDERS

(75) Inventors: Janet L Benton, Plano, TX (US);
Brenda D Dunn, Frisco, TX (US);
David L Fitzgerald, Corinth, TX (US)

(73) Assignee: Metasolv Software, Inc., Plano, TX (US)

( * ) Notice: Subject to any disclaimer, the term of this patent is extended or adjusted under 35 U.S.C. 154(b) by 1348 days.

(21) Appl. No.: 09/760,096

(22) Filed: Jan. 10, 2001

(65) Prior Publication Data

US 2002/0091588 A1 Jul. 11, 2002

(51) Int. Cl.
*G06Q 40/00* (2006.01)
(52) U.S. Cl. .......................... 705/27; 705/26
(58) Field of Classification Search ............. 705/26–27, 705/28; 717/162–167; 707/505; 379/221.05
See application file for complete search history.

(56) References Cited

U.S. PATENT DOCUMENTS

| | | | | |
|---|---|---|---|---|
| 5,610,910 A | * | 3/1997 | Focsaneanu et al. | 370/351 |
| 5,745,681 A | * | 4/1998 | Levine et al. | 709/200 |
| 5,890,175 A | * | 3/1999 | Wong et al. | 715/236 |
| 5,960,004 A | * | 9/1999 | Ramstrom et al. | 370/469 |
| 5,995,015 A | * | 11/1999 | DeTemple et al. | 340/825.49 |
| 6,118,777 A | * | 9/2000 | Sylvain | 370/351 |
| 6,249,773 B1 | * | 6/2001 | Allard et al. | 705/26 |
| 6,341,271 B1 | * | 1/2002 | Salvo et al. | 705/28 |
| 6,473,609 B1 | * | 10/2002 | Schwartz et al. | 455/406 |
| 6,718,535 B1 | * | 4/2004 | Underwood | 717/101 |
| 6,732,167 B1 | * | 5/2004 | Swartz et al. | 709/223 |
| 7,069,235 B1 | * | 6/2006 | Postelnik et al. | 705/26 |
| 7,333,600 B2 | * | 2/2008 | Gilles et al. | 379/221.01 |
| 2002/0072974 A1 | * | 6/2002 | Pugliese et al. | 705/14 |
| 2004/0111286 A1 | * | 6/2004 | Koenig et al. | 705/1 |
| 2004/0205597 A1 | * | 10/2004 | Abjanic | 715/513 |
| 2005/0060266 A1 | * | 3/2005 | DeMello et al. | 705/57 |
| 2006/0031147 A1 | * | 2/2006 | Bell et al. | 705/27 |

FOREIGN PATENT DOCUMENTS

WO    WO 98/52321    11/1998
WO    WO 00/31985    6/2000

OTHER PUBLICATIONS

PCT International Search Report in International Application No. PCT/US 02/00162, dated Oct. 9, 2002, 6 pages.

* cited by examiner

*Primary Examiner*—Hani Kazimi
*Assistant Examiner*—Bijendra K Shrestha
(74) *Attorney, Agent, or Firm*—Campbell Stephenson LLP

(57) ABSTRACT

An end-user requested service item may relate to a service item type having a developer defined label (DDL) that extends the attributes of the service item type by specifying an additional attribute for which a value may be collected from the end-user for creation of an end-user order for the service item. The value is not needed to complete the end-user order but is collected to avoid needing to collect the value from the end-user for subsequent creation of a corresponding inter-provider order. The value is automatically mapped from the end-user order to an appropriate field of the inter-provider order.

22 Claims, 3 Drawing Sheets

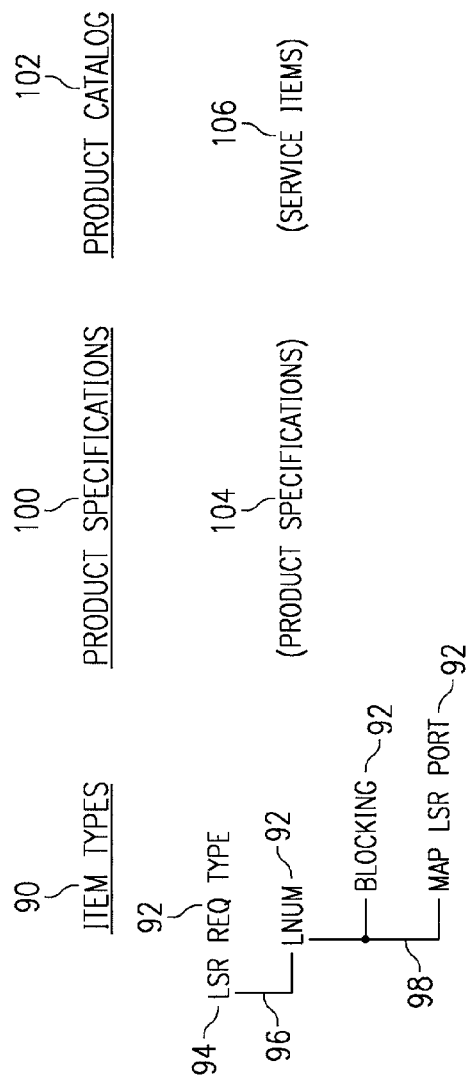
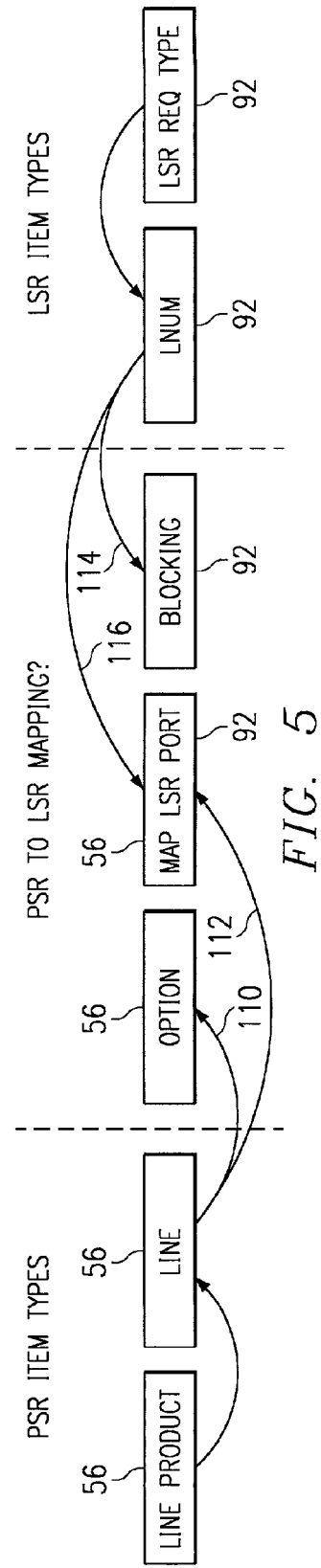
FIG. 4
FIG. 5

SYSTEM AND METHOD FOR MAPPING INFORMATION COLLECTED IN CONNECTION WITH CREATION OF END-USER ORDERS FOR COMMUNICATIONS SERVICES TO THE CORRESPONDING INTER-PROVIDER ORDERS

TECHNICAL FIELD OF THE INVENTION

This invention relates in general to provisioning of communications services and more particularly to a system and method for mapping information collected in connection with the creation of end-user orders for communication services to the corresponding inter-provider orders.

BACKGROUND OF THE INVENTION

A Local Exchange Carrier (LEC) must typically manage two types of orders for communications services—service orders for its end-user customers and service orders for other LECs. For example, an end-user might request a basic telephone line with call waiting service from a local service provider (LSP) such as a competitive LEC (CLEC). Personnel associated with the LSP must in turn capture sufficient information from the end-user to allow the LSP to provision the requested service items. If the LSP does not own appropriate network, equipment, or other resources necessary to satisfy the end-user request, personnel associated with the LSP must interpret the request to determine appropriate service details and then use the details to create a standardized Local Service Request (LSR). The LSP communicates the LSR to an incumbent LEC (ILEC) or other network service provider (NSP), which owns the network, equipment, and other resources necessary to satisfy the end-user request. The NSP provides requested service items based on the LSR and the LSP completes the provisioning process with respect to the service items. The required format for LSRs, which is defined in Local Service Ordering Guidelines (LSOG) of the Ordering & Billing Forum (OBF), is frequently revised as competition between LECs evolves, new local services become available, or changes occur in the manner in which local services are requested. Existing ordering mechanisms often require extensive re-coding in response to such changes.

In addition, there has typically been little if any integration between the end-user ordering mechanisms and inter-provider ordering mechanisms. An Operations Support System (OSS) associated with the LSP will typically provide an end-user ordering module that links requested service items to the capabilities of NSPs, but doing so usually requires extensive input of LSP personnel. Inter-provider orders, such as LSRs between LSPs and NSPs, may often contain much more information than end-user orders or may specify similar information but in a different format. A possible solution is to force LSP customer service personnel to interact with end-users, perhaps multiple times, to obtain all information required for corresponding LSRs. This is undesirable, however, in part because it requires such personnel to have familiarity with the complex details of the LSRs and associated inter-provider ordering modules, practices, or both. This is often unrealistic given the difficulty many LSPs have in hiring and retaining proficient customer service personnel. In addition, some LSPs may not need inter-provider ordering modules or may not have purchased end-user and inter-provider ordering modules from the same company, such that the LSPs would not want information for LSRs unduly complicating their end-user ordering processing. Since CLECs may "error out" as many as fifty percent of LSRs due to incorrect or incomplete data entry, streamlining the LSR creation process is often a significant concern.

Furthermore, even where end-user and inter-provider orders contain similar information for a service item and present it in substantially the same format, LSP personnel may still be required to input information twice—once for the end-user order and again for the LSR. Moreover, the end-user is often inconvenienced as a result of multiple contacts with LSP personnel—once in connection with creation of the end-user order and again in connection with creation of the LSR. This inconvenience may be exacerbated if the second or any subsequent contacts come from LSP provisioning personnel that are skilled in connection with provisioning issues but, unlike customer service personnel, are untrained in interacting with end-users. Alienation of the end-user resulting from a poorly handled interaction with such personnel is highly undesirable.

Although techniques allowing LSPs to map certain information from their end-user orders to corresponding LSRs have been developed to lessen some of the difficulties described above, none have allowed the mapping to be customized and extended, in response to revisions to the LSOG or other particular needs, with little impact on end-user ordering modules. One or more of these or other deficiencies have made previous techniques for generating inter-provider orders, such as LSRs, from end-user orders inadequate for the needs of many LSPs.

SUMMARY OF THE INVENTION

According to the present invention, problems and disadvantages associated with prior techniques for creating inter-provider orders according to corresponding end-user orders have been substantially reduced or eliminated.

In one embodiment of the present invention, a system for mapping values collected in connection with creation of end-user orders for communications services to corresponding inter-provider orders includes an end-user ordering module and an inter-provider ordering module. The end-user ordering module determines whether an end-user requested service item contained in a service provider product catalog relates to a service item type having at least one associated developer defined label (DDL). The DDL extends the attributes of the associated service item type by specifying an additional attribute for which a value may be collected from the end-user and supplied in connection with creation of an end-user order for the requested service item. The value is not needed to complete the end-user order but is collected and supplied to avoid needing to collect the value from the end-user in connection with subsequent creation of an inter-provider order that corresponds to the end-user order. If the requested service item relates to a service item type having at least one DDL, the end-user ordering module prompts a user of the end-user ordering module to collect from the end-user and supply a value for the additional DDL-specified attribute in connection with creation of the end-user order for the requested service item. The end-user ordering module communicates the end-user order for use in the subsequent creation of the corresponding inter-provider order. The inter-provider ordering module receives the end-user order and determines whether the end-user order has a value for the additional DDL-specified attribute. If the end-user order has a value for the additional DDL-specified attribute, the inter-provider ordering module automatically maps the value from the end-user order to an appropriate field of the inter-provider order such that the value need not be collected from the end-user in connection with creation of the inter-provider order.

In another embodiment, end-user ordering module software facilitates the mapping of values collected in connection with the creation of end-user orders for communications services to corresponding inter-provider orders. When executed, the software operates to determine whether an end-user requested service item contained in a service provider product catalog relates to a service item type having at least one associated DDL. The DDL extends the attributes of the associated service item type by specifying an additional attribute for which a value may be collected from the end-user and supplied in connection with creation of an end-user order for the requested service item. The value is not needed to complete the end-user order but is collected and supplied to avoid needing to collect the value from the end-user in connection with subsequent creation of an inter-provider order corresponding to the end-user order. If the requested service item relates to a service item type having at least one DDL, the software prompts a user of the software to collect from the end-user and supply a value for the additional DDL-specified attribute in connection with creation of the end-user order for the requested service item. The software provides the end-user order to inter-provider ordering module software for use in subsequently creating the corresponding inter-provider order, such that the inter-provider ordering module software can determine whether the end-user order has a value for the additional DDL-specified attribute and also such that, if the end-user order has a value for the additional DDL-specified attribute, the inter-provider ordering module software can automatically map the value from the end-user order to an appropriate field of the inter-provider order such that the value need not be collected from the end-user in connection with creation of the inter-provider order.

In a further embodiment, inter-provider ordering module software facilitates the mapping of values collected in connection with creation of end-user orders for communications services to corresponding inter-provider orders. When executed, the software operates to access an end-user order for use in subsequently creating a corresponding inter-provider order. The software determines whether the end-user order has a value for at least one DDL, the DDL being associated with a service item type related to an end-user requested service item contained in a service provider product catalog. The DDL extends the attributes of the associated service item type by specifying an additional attribute for which a value may be collected from the end-user and supplied in connection with creation of the end-user order for the requested service item. The value is not needed to complete the end-user order but is collected and supplied to avoid needing to collect the value from the end-user in connection with subsequent creation of the corresponding inter-provider order. If the end-user order has a value for the additional DDL-specified attribute, the software operates to automatically map the value from the end-user order to an appropriate field of the inter-provider order such that the value need not be collected from the end-user in connection with creation of the inter-provider order.

The present invention provides a number of technical advantages over prior techniques. The present invention allows information, such as values for additional DDL-specified attributes, to be collected from an end-user, supplied on an end-user order, and automatically mapped through to an LSR or other inter-provider order. This allows certain fields of the LSR to be automatically populated without further interaction with the end-user. As a result, the provisioning process is more efficient, more reliable, and less burdensome on the end-user. Furthermore, if the industry mandates changes in the LSR format, one or more DDLs may be readily associated with appropriate item types to accommodate these changes, without requiring new software to be developed. The present invention thus provides an integrated, data-driven, and product catalog centric solution that benefits both LSPs and end-users alike. Systems and methods incorporating one or more of these or other technical advantages are well suited for communications service provisioning environments. Other technical advantages are readily apparent to those skilled in the art from the following figures, descriptions, and claims.

BRIEF DESCRIPTION OF THE DRAWINGS

To provide a more complete understanding of the present invention and features and advantages thereof, reference is made to the following description in conjunction with the accompanying drawings, in which:

FIG. 4 illustrates exemplary LSR item type, product specification, and product catalog hierarchies; and FIG. 5 illustrates exemplary mapping between PSR and LSR item type hierarchies.

DETAILED DESCRIPTION OF THE INVENTION

Figure 1:
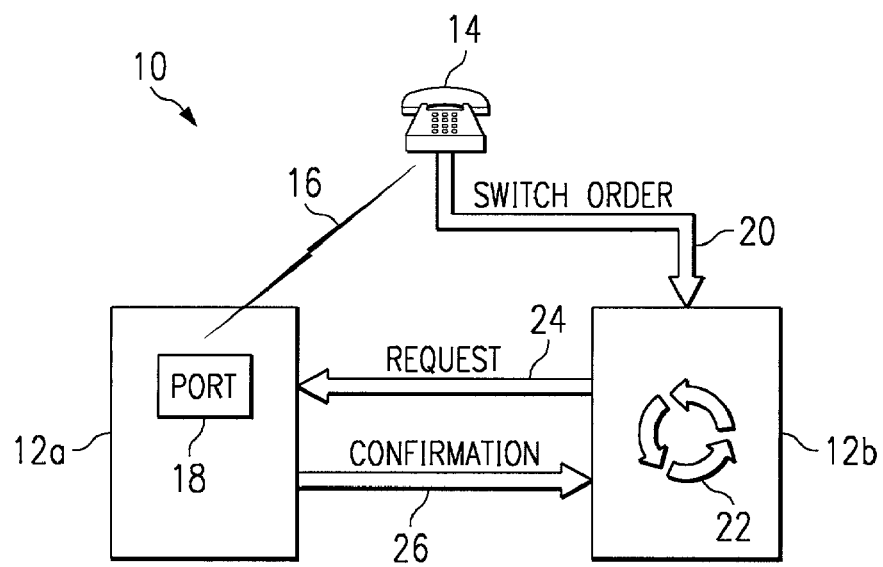
FIG. 1 illustrates an exemplary business scenario involving switching of residential line service between LSPs.

FIG. 1 illustrates an exemplary business scenario 10 involving first LSP 12a, end-user customer 14 of first LSP 12a, and second LSP 12b. Business scenario 10 is used to describe the general process of mapping information according to the present invention from a Product Service Request (PSR) or another end-user order to an LSR or another inter-provider order in connection with switching residential line service for the end-user 14 from LSP 12a to LSP 12b. In this example, end-user 14 has existing residential line service through the first (old) LSP 12a, which might be an ILEC, and is transferring this residential line service to the second (new) LSP 12b, which might be a CLEC. Existing residential line service is being provided through first LSP 12a over local loop 16 between end-user 14 and an appropriate port 18 of first LSP 12a.

First, end-user 14 communicates with second LSP 12b and arranges for the residential line service to be switched to second LSP 12b from first LSP 12a (as is indicated by arrow 20). End-user 14 may request, either explicitly or implicitly, one or more suitable service items from the product catalog of LSP 12b in arranging for this switching of service. Second, a customer service representative associated with the second LSP 12b collects appropriate information from the end-user 14, typically including values for attributes of the requested service items, and then supplies this information to a PSR or other end-user order. In this particular example, requested service items may include an "Unbundled Port" service item, although any suitable service items may be requested. The second LSP 12b is able to create a PSR for an unbundled service item based on an existing arrangement between second LSP 12b and first LSP 12a. The second LSP 12b analyzes the service items on the PSR and, according to the present invention, maps the associated values to an LSR or other inter-provider order (as indicated by arrow 22). Finally, second LSP 12b sends the LSR to first LSP 12a (as indicated by arrow 24), the second LSP 12b provisions the requested service items, the first LSP 12a changes the account information for end-user 14 in its system, and first LSP 12a sends a confirmation to second LSP 12b to complete the transaction (as indicated using arrow 26).

Figure 2:
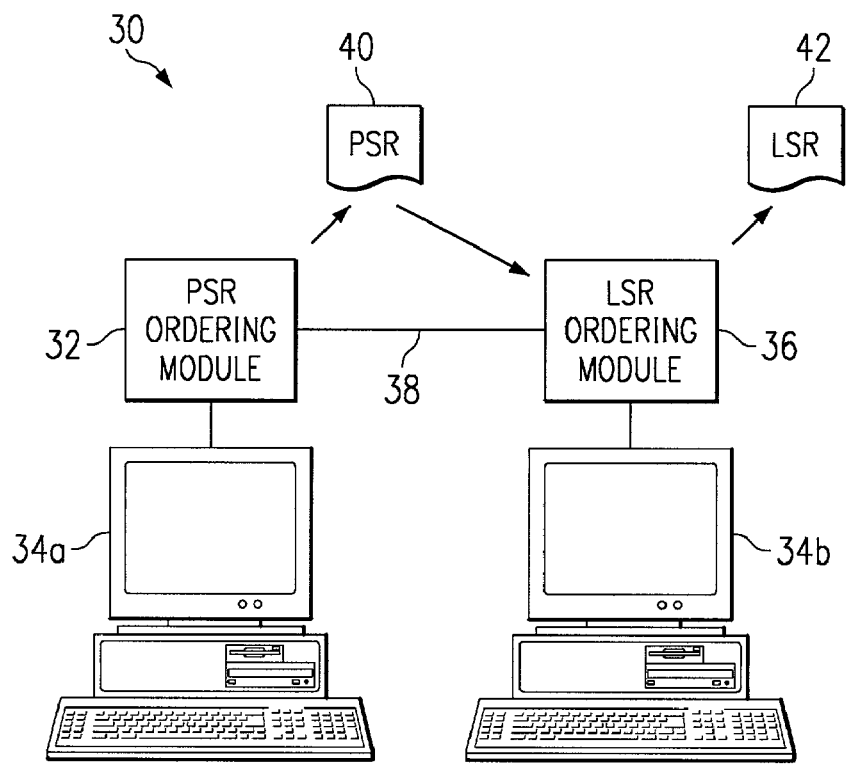
FIG. 2 illustrates an exemplary system for mapping information collected in connection with the creation of end-user orders for communications services to corresponding inter-provider orders.

FIG. 2 illustrates exemplary system 30 for mapping certain information collected in connection with creation of PSRs or other end-user orders to LSRs or other inter-provider orders. Although PSRs and LSRs are primarily described, the present invention contemplates any appropriate end-user orders and inter-provider orders, respectively. System 30 includes a PSR ordering module 32, an associated user 34a, an LSR ordering module 36, and an associated user 34b. PSR ordering module 32 and LSR ordering module 36 may be integral to or separate from each other, in whole or in part, and may communicate with each other using any suitable wireline, wireless, or other communications link 38. Moreover, users 34a and 34b may be the same or different users 34. The components of PSR ordering module 32 and LSR ordering module 36 may operate on one or more computer systems at one or more locations and may share one or more appropriate resources or constructs. For example, the PSR and LSR ordering modules 32 and 36, respectively, may share the same database schema. In general, the user 34a interacts with the end-user 14 and creates a PSR 40 using the PSR ordering module 32 and communicates information collected on the PSR 40 to LSR ordering module 36. User 34b uses LSR ordering module 36 to create a corresponding LSR 42 to effect provisioning of the service items requested by end-user 14.

Figure 3:
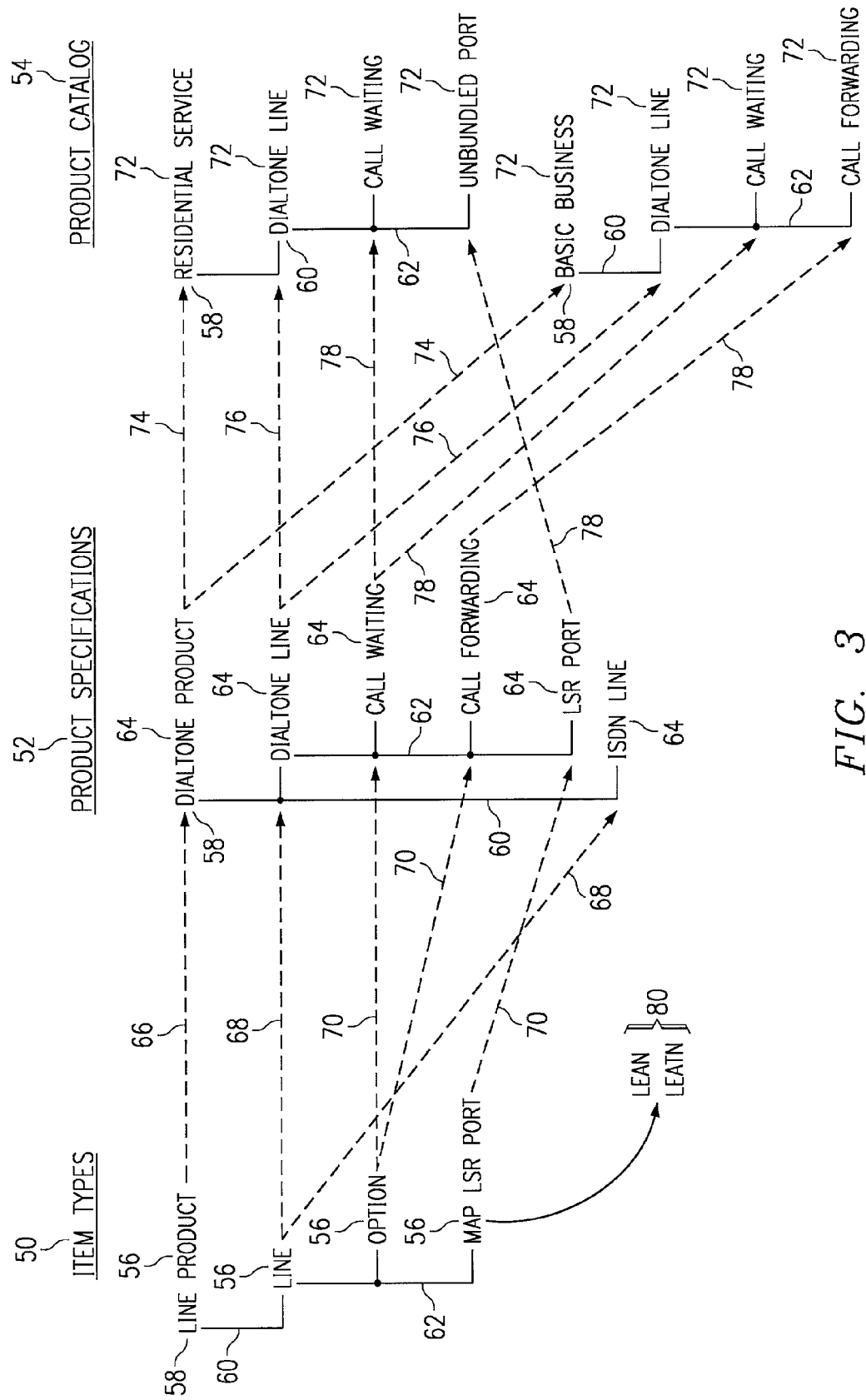
FIG. 3 illustrates exemplary PSR item type, product specification, and product catalog hierarchies.

FIG. 3 illustrates exemplary item type hierarchy 50, product specification hierarchy 52, and product catalog hierarchy 54 and relationships that exist between the elements of hierarchies 50, 52, and 54. In this example, item type hierarchy 50 contains service item types 56 corresponding to line products that an LSP 12 may provide and market to end-users 14. The hierarchy 50 contains "Line Product" item type 56 at a first level 58, "Line" item type 56 (a subset of the "Line Product" item type 56) at a second level 60, and "Option" and "MapLSRPort" item types 56 (both subsets of "Line" item type 56) at a third level 62. In general, item types 56 within hierarchy 50 form the foundation on which product specification hierarchy 52 and product catalog hierarchy 54 are constructed. While only a portion of hierarchy 50 corresponding to exemplary line products is described, those skilled in the art will appreciate that the present invention contemplates any suitable item types 56. For example, item types 56 in complete hierarchy 50 may additionally include, without limitation, "Trunk Product," "Non-Premise Product," "Line Option," "Key Option," "Product Option," "Business Set," "Flow through Command," "Flow through Plan," and any other appropriate item types 56.

In general, the item types 56 in hierarchy 50 provide building blocks that a developer of PSR ordering module 32 controls, and may therefore code against, in specifying the logic implemented within PSR ordering module 32 and information that needs to be collected at the PSR creation stage. Thus, in one embodiment, the item types 56 specify developer defined rules (DDRs) for collecting and processing information associated with the creation of PSRs 40. Moreover, as described more fully below, a developer may code against item types 56 to specify information that needs to be collected during the PSR creation stage not for use in creating PSRs 40 but for mapping to subsequently created LSRs 42. Item type hierarchy 50 and its associated item types 56 are preferably unavailable to and cannot be changed by a customer, such as an LSP 12, that has purchased PSR ordering module 32 from the developer. If any changes to hierarchy 50 are called for, the customer contacts the developer to implement such changes.

In this example, in accordance with the exemplary item type hierarchy 50, product specification hierarchy 52 contains product specifications 64 corresponding with item types 56 in hierarchy 50. This hierarchy 52 contains "Dialtone Product" product specification 64 at first level 58, "Dialtone Line" and "ISDN Line" product specifications 64 (both subsets of "Dialtone Product" product specification 64) at second level 60, and "Call Waiting," "Call Forwarding," and "LSR Port" product specifications 64 (all subsets of "Dialtone Line" product specification 64) at third level 62. Although a portion of hierarchy 52 corresponding to the exemplary line products is described, the present invention contemplates any hierarchically related product specifications 64. In general, product specifications 64 define templates, based on associated item types 56 in hierarchy 50, for line products that LSP 12 is capable of provisioning to end users 14. Therefore, product specifications 64 also provide a boundary for the service items (in this example, service items relating to line products) that the LSP product catalog may contain for actual sale to the end-users 14.

In one embodiment, LSP 12 may create any product specifications 64 that meet its particular needs, limited only by the underlying service item types 56. As indicated by arrow 66 at level 58, LSP 12 is able to provision "Dialtone Product" product specification 64 because the developer has made the corresponding "Line Product" item type 56 available within the hierarchy 50. Similarly, as indicated by arrows 68 at level 60, LSP 12 is able to provision "Dialtone Line" and "ISDN Line" product specifications 64 because the developer has made the corresponding "Line" item type 56 available within hierarchy 50. Similarly, as indicated by arrows 70 at level 62, LSP 12 is able to provision "Call Waiting," "Call Forwarding," and "LSR Port" product specifications 64 because the developer has made the corresponding "Option" and "MapLSRPort" item types 56 available in hierarchy 50. As a simple analogy, an item type 56 might correspond to a shirt and product specifications 64 linked to that item type 56 might specify all the colors and sizes of shirts that can actually be made. Product specifications 64 may be differentiated from each other and processed according to their underlying item types 56.

In this example, according to exemplary product specification hierarchy 52, the product catalog hierarchy 54 contains various product catalog service items 72 corresponding to product specifications 64 in hierarchy 52. Hierarchy 54 contains "Residential Service" and "Basic Business" service items 72 at first level 58. First and second "Dialtone Line" service items 72 (subset of "Residential Line" service item 72 and "Basic Business" service item 72, respectively) are at second level 60. "Call Waiting" and "Unbundled Port" service items 72 (subsets of first "Dialtone Line" service item 72) and "Call Waiting" and "Call Forwarding" service items 72 (subsets of second "Dialtone Line" service item 72) are at third level 62. Again, although a portion of hierarchy 54 corresponding to the exemplary line products is described, the present invention contemplates any appropriate hierarchically related service items 72. In general, service items 72 define, based on associated product specifications 64 in hierarchy 52, the particular line products that LSP 12 actually markets for sale to end-users 14.

In one embodiment, LSP 12 may create any service items 72 that meet its particular needs, limited only by the underlying product specifications 64. As is indicated by arrows 74 at level 58, LSP 12 is able to sell "Residential Service" and "Basic Business" service items 72 because corresponding "Dialtone Product" product specification 64 has already been made available within hierarchy 52. Similarly, as indicated by arrows 76 at level 60, LSP 12 is able to sell first and second "Dialtone Line" service items 72 because corresponding "Dialtone Line" product specification 64 has already been made available within hierarchy 52. Similarly, as indicated by arrows 78 at level 62, LSP 12 is able to sell "Call Waiting" and "Unbundled Port" service items 72 for a residential service dialtone line because corresponding "Call Waiting" and "LSR Port" product specifications 64 have already been made available within hierarchy 50. LSP 12 is able to sell "Call Waiting" and "Call Forwarding" service items 72 for a basic business dialtone line because the corresponding "Call Waiting" and "Call Forwarding" product specifications 64 have already been made available within hierarchy 50.

Continuing the simple analogy in which item type 56 corresponds to a shirt and product specifications 64 linked to that item type 56 specify all the colors (red, blue, etc.) and sizes (large, medium, etc.) of shirts that can actually be made, service items 72 might specify the particular shirts that will actually be sold to customers (large red shirt, medium blue shirt, etc.). Thus, through the relationships between service items 72, product specifications 64, and item types 56, marketing personnel associated with LSP 12 are prevented from selling services that LSP 12 is unable to actually provision. Marketing personnel are only presented with an opportunity to sell those service items 72 for which relationships flow back through valid product specifications 64 and item types 56.

Each item type 56 within hierarchy 50 has a corresponding set of features, characteristics, or other attributes for which values need to be supplied in creating a PSR or other end-user order 40. Certain of these values may in turn be needed for LSR or other inter-provider order 42 being created based upon the PSR 40. For values that have already been collected in connection with PSR 40, and which are needed for LSR 42, it is preferable to map those values through to LSR 42 such that they need not be collected again from the end-user 14. Such mapping reduces the inconvenience to end-user 14 in obtaining requested service items 72 and improves the efficiency and reliability of the transaction for LSP 12. Further, there may be values that, while not needed for PSR 40, are needed in later creating an LSR 42 based on PSR 40. It is desirable to collect such information from end user 14 in connection with creation of PSR 40, at the same time other information needed for PSR 40 is being collected, once again to reduce the need to contact the end-user 14 multiple times. According to the present invention, developer defined labels (DDLs) are provided to extend features, characteristics, or other attributes of corresponding item types 56, such that the values that are supplied at the PSR creation stage are mapped through for use at the LSR creation stage.

For example only and not by way of limitation, DDLs 80 associated with "MapLSRPort" item type 56 may include Line Existing Account Number (LEAN) DDL 80 and Line Existing Account Telephone Number (LEATN) DDL 80. This indicates that LEAN and LEATN are additional attributes of "MapLSRPort" item type 56, the item type 56 for "Unbundled Port" service item 72. In the exemplary business scenario 10 described above with reference to FIG. 1, LSP 12a (from which service is being switched) may need LEAN and LEATN values to properly identify the end-user 14 to effect the switch. In operation, if a customer service representative associated with the LSP 12b (to which service is being switched) is creating a PSR 40 that involves the "Unbundled Port" service item 72, additional LEAN and LEATN fields may be presented to the LSP representative as needing values at the PSR creation stage. The representative obtains the information from end-user 14 and supplies the LEAN and LEATN values in the appropriate fields of PSR 40 or otherwise. As a result, the LEAN and LEATN values may be mapped through for use at the LSR creation stage, along with any other values collected for "Unbundled Port" service item 72 based on inherent attributes of its "MapLSRPort" item type 56.

Although LEAN and LEATN DDLs 80 are primarily described, the present invention contemplates any suitable DDLs 80 associated with item types 56 in an appropriate item type hierarchy 50 to extend the attributes of those item types 56. Each item type 56 may have zero, one, or multiple associated DDLs 80. Although only "Unbundled Port" service item 72 was associated with the "MapLSRPort" item type 56 having DDLs 80 in the above example, a DDL 80 will be effective as to all service items 72 associated with the item type 56 of the DDL 80. For example, if a DDL 80 had been associated with "Option" item type 56, the field corresponding to that DDL 80 would be presented as needing a supplied value in connection with a PSR 40 having: (1) "Call Waiting" service item 72 for a residential service dialtone line being ordered, (2) "Call Waiting" service item 72 for a basic business dialtone line being ordered; or (3) "Call Forwarding" service item 72 for a basic business dialtone line being ordered. According to the present invention, DDLs 80 therefore provide a generic mechanism to add fields associated with values to be collected at the PSR creation stage for mapping through to the LSR creation stage.

The availability of DDLs 80 provides desirable extensibility to the PSR to LSR mapping process. For example, if the industry mandates that LSRs 42 should from some date forward include one or more additional fields requiring values, then the developer of PSR ordering module 32 can readily associate one or more suitable DDLs 80 with appropriate item types 56 within hierarchy 50 to accommodate these additional fields. The LSP 12 is then able to map these DDL values, once collected during the PSR creation stage, through to the subsequent LSR creation stage. As a result, despite these additional fields, the LSP 12 is still able to reduce or eliminate multiple contacts with end-users 14. Nor will LSP 12 be required to purchase an entirely new PSR ordering module 32 or LSR ordering module 36 to obtain these benefits. DDLs 80 provide a measure of future-proofing not available using prior techniques.

Analogous to item type hierarchy 50, product specification hierarchy 52, and service item hierarchy 54 described above in connection with PSRs 40, there exist hierarchies of items types, product specifications, and service items associated with creating LSRs 42. However, LSR related hierarchies are not in general the same as the corresponding PSR related hierarchies 50, 52, and 54. The LSR hierarchies are industry mandated, are not customizable for particular developers or LSPs 12, and specify the exhaustive set of service items that can be ordered through an LSR 42 (and the exhaustive set of corresponding product specifications and item types on which the service items are based). Thus, as illustrated in FIG. 4, an LSR item type hierarchy 90 may include "LSRNum" and "LSReqType" item types 92 at level 94 analogous to "Line Product" item type 56 at level 58 in PSR item type hierarchy 50, may include "Lnum" item type 92 at level 96 analogous to "Line" item type 56 at level 60 in PSR item type hierarchy 50, and may further include "Blocking" and "MapLSRPort" item types 92 at level 98 analogous to "Option" and "MapLSRPort" item types 56 at level 62 in PSR item type hierarchy 50. Although not explicitly shown, LSR product specification hierarchy 100 and product catalog hierarchy 102 may include product specifications 104 and service items 106, respectively, that are analogous to PSR product specification hierarchy 52 and product catalog hierarchy 54, respectively, described above.

Accordingly, the PSR and LSR ordering modules 32 and 36, respectively, used to create PSRs 40 and LSRs 42, respectively, have overlapping although not matching hierarchical data structures. For mapping of a DDL 80 associated with a PSR service item 72 through to an LSR service item 106, these differing PSR and LSR data structures must have in common the item type 56 that is associated with DDL 80—that is, the item type 56 in the PSR item type hierarchy 50 having DDL 80 must have a corresponding item type 92 in LSR item type hierarchy 90. FIG. 5 illustrates exemplary mapping between PSR and LSR item type hierarchies 30 and 70, respectively. As indicated by arrows 110 and 112, "Option" and "MapLSRPort" item types 56, respectively, are linked to "Line" item type 56 in the PSR item type hierarchy 50. As indicated by arrows 114 and 116, "Blocking" and "MapLSRPort" item types 92, respectively, are linked to "LNum" item type 92 in LSR item type hierarchy 90. In this particular example, only "MapLSRPort" item type type 56, 92 is common to both hierarchies 50 and 90 such that the associated DDLs 80 can be mapped from PSR 40 to LSR 42. Since "Option" item type 56 is not linked to the "Lnum" item type 92, however, there is no mapping from PSR 40 to LSR 42 for "Option" item type 56. As explained above, the specific item type 56, 92 described herein are exemplary and provided for purposes of illustration. Those skilled in the art will readily appreciate that the present invention encompasses mapping of any suitable DDL 80 from PSR 40 to LSR 42 in relation to any associated item type 56, 72, according to particular needs.

In operation, assume that an end-user 14 has requested an unbundled port in connection with a residential service dial-tone line. In one embodiment, a customer service representative handling the end-user request for LSP 12 uses a suitable user interface associated with PSR ordering module 32 to navigate to or otherwise select "Residential Service" service item 72 from the product catalog of the LSP 12. In response to selection of "Residential Service" service item 72, user 34a is given the opportunity to navigate to or otherwise select "Dial-tone Line" service item 72 and then "Unbundled Port" service item 72. In response, PSR ordering module 32 then determines whether "Unbundled Port" service item 72 can be related back through "LSR Port" product specification 64 to "MapLSRPort" item type 56. In this case, "Unbundled Port" service item 72 does relate back to "MapLSRPort" item type 56. PSR ordering module 32 therefore determines that values associated with DDLs 80 need to be collected and prompts user 34a to supply the DDL values. In this case, user 34a would be prompted to collect from end-user 14 and supply the LEAN and LEATN values for later mapping through to the LSR creation stage. As described above, the collection of these DDL values during the PSR creation stage reduces or eliminates the need for LSP personnel to contact the end-user 14 again during the subsequent LSR creation stage to obtain these values, which provides an important technical advantage.

In one embodiment, PSR ordering engine 32 may validate that appropriate DDL values (such as the LEAN and LEATN values) have been properly supplied before accepting PSR 40 as completed, even though these DDL values may not be required until the LSR creation stage. PSR ordering module 32 communicates the completed PSR 40 to the LSR ordering module 36 for creation of a suitable LSR 42 based on PSR 40.

At least some information on PSR 40 is mapped through to the LSR 42. In addition, DDL values collected during the PSR creation stage (but not needed for PSR 40 itself) are mapped through to the LSR 42. In practice, the LSRs 42 to which DDL values are mapped may include multiple separate forms, each of which includes one or more fields populated with these DDL values. For example, LSR 42 typically includes three forms—a "Port Services" form containing service specific information, a "Local Service Request" form that contains administrative information, and an "End User" form containing end-user related information.

In one embodiment, to map a DDL value collected at the PSR creation stage through to LSR 42, LSR ordering module 36 evaluates each service item 72 on the PSR 40 to determine whether the service item 72 can be related back to an item type 56 in PSR item type hierarchy 50 with which DDL 80 is associated. If so, the LSR ordering module 36 maps the DDL value to a service item 106 contained on the LSR 42 that corresponds to service item 72. The mapping between service item 72 and service item 106 may be according to any suitable pre-defined mapping relationship, according to particular needs.

Although the present invention has been described with several embodiments, a plethora of changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A computer system executing program code for mapping values collected in connection with creation of end-user orders for communications services to corresponding inter-provider orders, wherein the computer system comprises:

a first processor;

a display device coupled to the first processor;

an end-user ordering module, executable by the first processor, and configured to:

display a service provider product catalog to an end user using the display device, wherein the service provider product catalog comprises one or more service items, each corresponding to a service item type, each service item type has a corresponding set of service specifications that describe the service item type, one or more service items correspond to a corresponding local product item of one or more local product items available from an interprovider ordering module, each local product item corresponds to a local item type, and each local item type has a corresponding set of local specifications that describe the local item type;

provide one or more developer defined labels (DDLs) for each of the one or more service items that have a corresponding local product item, wherein each DDL comprises a local specification from the set of local specifications that is missing from the set of service specifications;

determine whether an end-user requested service item relates to a service item type having at least one associated DDL;

if the requested service item relates to a service item type having at least one DDL, prompt the end-user for a value of each additional DDL-specified attribute in connection with creation of an end-user order for the requested service item; and communicate the end-user order for use in subsequently creating a corresponding inter-provider order; and a second processor; and the inter-provider ordering module, executable by the second processor, coupled to the end-user ordering module and configured to:

receive the end-user order;

determine whether the end-user order has a value for each additional DDL specified attribute; and if the end-user order has a value for the additional DDL-specified attribute, automatically map the value from the end-user order to an appropriate field of the inter-provider order.

2. The system of claim 1, wherein the inter-provider order comprises an industry standard Local Service Request (LSR).

3. The system of claim 2, wherein:

the requested service item is an unbundled port;

the additional DDL-specified attribute is selected from the group consisting of a Local Existing Account Number (LEAN) and a Local Existing Account Telephone Number (LEATN); and the associated service item type is provided for mapping an unbundled port from an end user order to an LSR.

4. The system of claim 2, wherein the DDL allows a developer of the end-user ordering module to provide for collection of additional attribute values in response to an industry mandated change in LSR format without necessitating the development of new software.

5. The system of claim 2, wherein the value is automatically mapped to appropriate fields of multiple forms included within the LSR.

6. The system of claim 1, wherein the end-user ordering module is operable to relate the requested service item to a product specification and relate the product specification to a service item type to determine whether the requested service item relates to a service item type having a DDL.

7. The system of claim 1, wherein the end-user ordering module is further operable to validate that the value for the additional DDL-specified attribute has been supplied before communicating the end-user order.

8. A data storage medium storing program code for mapping values collected in connection with creation of end-user orders for communications services to corresponding inter-provider orders, the program code, when executed by one or more computers, is configured to:

display a service provider product catalog to an end user, wherein the service provider product catalog comprises one or more service items, each corresponding to a service item type, each service item type has a corresponding set of service specifications that describe the service item type, one or more service items correspond to a corresponding local product item of one or more local product items available from an inter-provider ordering module, each local product item corresponds to a local item type, and each local item type has a corresponding set of local specifications that describe the local item type;

provide one or more developer defined labels (DDLs) for each of the one or more service items that have a corresponding local product item, wherein each DDL comprises a local specification from the set of local specifications that is missing from the set of service specifications;

determine whether an end-user requested service item relates to a service item type having at least one associated DDL;

if the requested service item relates to a service item type having at least one DDL, prompt the end-user for a value of each additional DDL-specified attribute in connection with creation of an end-user order for the requested service item; and provide the end-user order for use in subsequently creating the corresponding interprovider order;

determine whether the end-user order has a value for each additional DDL-specified attribute; and if the end-user order has a value for the additional DDL-specified attribute, automatically map the value from the end-user order to an appropriate field of the inter-provider order.

9. The data storage medium of claim 8, wherein the inter-provider order comprises an industry standard Local Service Request (LSR).

10. The data storage medium of claim 9, wherein: the requested service item is an unbundled port; the additional DDL-specified attribute is selected from the group consisting of a Local Existing Account Number (LEAN) and a Local Existing Account Telephone Number (LEATN); and the associated service item type is provided for mapping an unbundled port from an end-user order to an LSR.

11. The data storage medium of claim 9, wherein the DDL allows a developer of the program code to provide for collection of additional attribute values in response to an industry mandated change in LSR format without necessitating the development of new program code.

12. The data storage medium of claim 9, wherein the value is automatically mapped to appropriate fields of multiple forms included within the LSR.

13. The data storage medium of claim 8, wherein the program code, upon execution, is operable to relate the requested service item to a product specification and relate the product specification to a service item type to determine whether the requested service item relates to a service item type having a DDL.

14. The data storage medium of claim 8, wherein the program code, upon execution, is further operable to validate that the value for the additional DDL-specified attribute has been supplied before providing the end-user order.

15. A computer-implemented method of mapping values collected in connection with creation of end-user orders for communications services to corresponding interprovider orders, the method comprising:

displaying a service provider product catalog to an end user, wherein the service provider product catalog comprises one or more service items, each corresponding to a service item type, each service item type has a corresponding set of service specifications that describe the service item type, one or more service items correspond to a corresponding local product item of one or more local product items available from an inter-provider ordering module, each local product item corresponds to a local item type, each local item type has a corresponding set of local specifications that describe the local item type, and said displaying is performed using a display coupled to a computer executing the computer-implemented method;

providing one or more developer defined labels (DDLs) for each of the one or more service items that have a corresponding local product item, wherein each DDL comprises a local specification from the set of local specifications that is missing from the set of service specifications, and the one or more DDLs are stored using a memory coupled to the computer executing the computer-implemented method;

determining whether an end-user requested service item relates to a service item type having at least one associated DDL, said determining is performed by the computer executing the computer-implemented method;

if the requested service item relates to a service item type having at least one DDL, prompting the end-user for a value of each additional DDL-specified attribute in connection with creation of an end-user order for the requested service item;

providing the end-user order for subsequent use in creating the corresponding interprovider order;

determining whether the end-user order has a value for the additional DDL-specified attribute; and if the end-user order has a value for the additional DDL-specified attribute, automatically mapping the value from the end-user order to an appropriate field of the interprovider order, said mapping is performed by the computer executing the computer-implemented method.

16. The method of claim 15, wherein the inter-provider order comprises an industry standard Local Service Request (LSR).

17. The method of claim 16, wherein: the requested service item is an unbundled port; the additional DDL-specified attribute is selected from the group consisting of a Local Existing Account Number (LEAN) and a Local Existing Account Telephone Number (LEATN); and the associated service item type is provided for mapping an unbundled port from an end-user order to an LSR.

18. The method of claim 16, wherein the DDL allows a developer of software performing the method to provide for collection of additional attribute values in response to an industry mandated change in LSR format without necessitating the development of new software.

19. The method of claim 16, wherein the value is automatically mapped to appropriate fields of multiple forms included within the LSR.

20. The method of claim 15, wherein the requested service item is related to a product specification and the product specification is related to a service item type to determine whether the requested service item relates to a service item type having a DDL.

21. The method of claim 15, further comprising validating that the value for the additional DDL-specified attribute has been supplied before providing the end-user order.

22. A computer system containing executable program code for mapping values collected in connection with creation of end-user orders for communications services to corresponding inter-provider orders, wherein the program code comprises:

means for displaying a service provider product catalog to an end user, wherein the service provider product catalog comprises one or more service items, each corresponding to a service item type, each service item type has a corresponding set of service specifications that describe the service item type, one or more service items correspond to a corresponding local product item of one or more local product items available from an inter-provider ordering module, each local product item corresponds to a local item type, and each local item type has a corresponding set of local specifications that describe the local item type;

means for providing one or more developer defined labels (DDLs) for each of the one or more service items that have a corresponding local product item, wherein each DDL comprises a local specification from the set of local specifications that is missing from the set of service specifications;

means for determining whether an end-user requested service item relates to a service item type having at least one associated DDL;

means for, if the requested service item relates to a service item type having at least one DDL, prompting the end-user for a value of each additional DDL-specified attribute in connection with creation of an end-user order for the requested service item;

means for providing the end-user order for use in subsequently creating a corresponding inter-provider order;

means for determining whether the end-user order includes a value for each additional DDL-specified attribute; and means for, if the end-user order has a value for the additional DDL-specified attribute, automatically mapping the value from the end-user order to an appropriate field of the inter-provider order.

* * * * *

UNITED STATES PATENT AND TRADEMARK OFFICE
CERTIFICATE OF CORRECTION

| | | |
|---|---|---|
| PATENT NO. | : 7,567,923 B2 | Page 1 of 1 |
| APPLICATION NO. | : 09/760096 | |
| DATED | : July 28, 2009 | |
| INVENTOR(S) | : Janet L. Benton et al. | |

It is certified that error appears in the above-identified patent and that said Letters Patent is hereby corrected as shown below:

In column 1, line 14, delete "communication" and insert -- communications --, therefor.

In column 9, line 23, before "56" delete "type". (1st occurrence)

In column 10, line 47, in claim 1, delete "interprovider" and insert -- inter-provider --, therefor.

In column 11, line 21, in claim 3, delete "end user" and insert -- end-user --, therefor.

In column 12, line 5, in claim 8, delete "interprovider" and insert -- inter-provider --, therefor.

In column 12, line 43, in claim 15, delete "interprovider" and insert -- inter-provider --, therefor.

In column 12, line 59, in claim 15, delete "displying" and insert -- displaying --, therefor.

In column 13, line 14, in claim 15, delete "interprovider" and insert -- inter-provider --, therefor.

In column 13, line 20, in claim 15, delete "interprovider" and insert -- inter-provider --, therefor.

Signed and Sealed this

Twenty-ninth Day of June, 2010

David J. Kappos
*Director of the United States Patent and Trademark Office*